Aug. 16, 1932.  E. L. JONES  1,871,701
RECEPTACLE CLOSING AND SEALING MEANS
Filed June 16, 1928  10 Sheets-Sheet 1
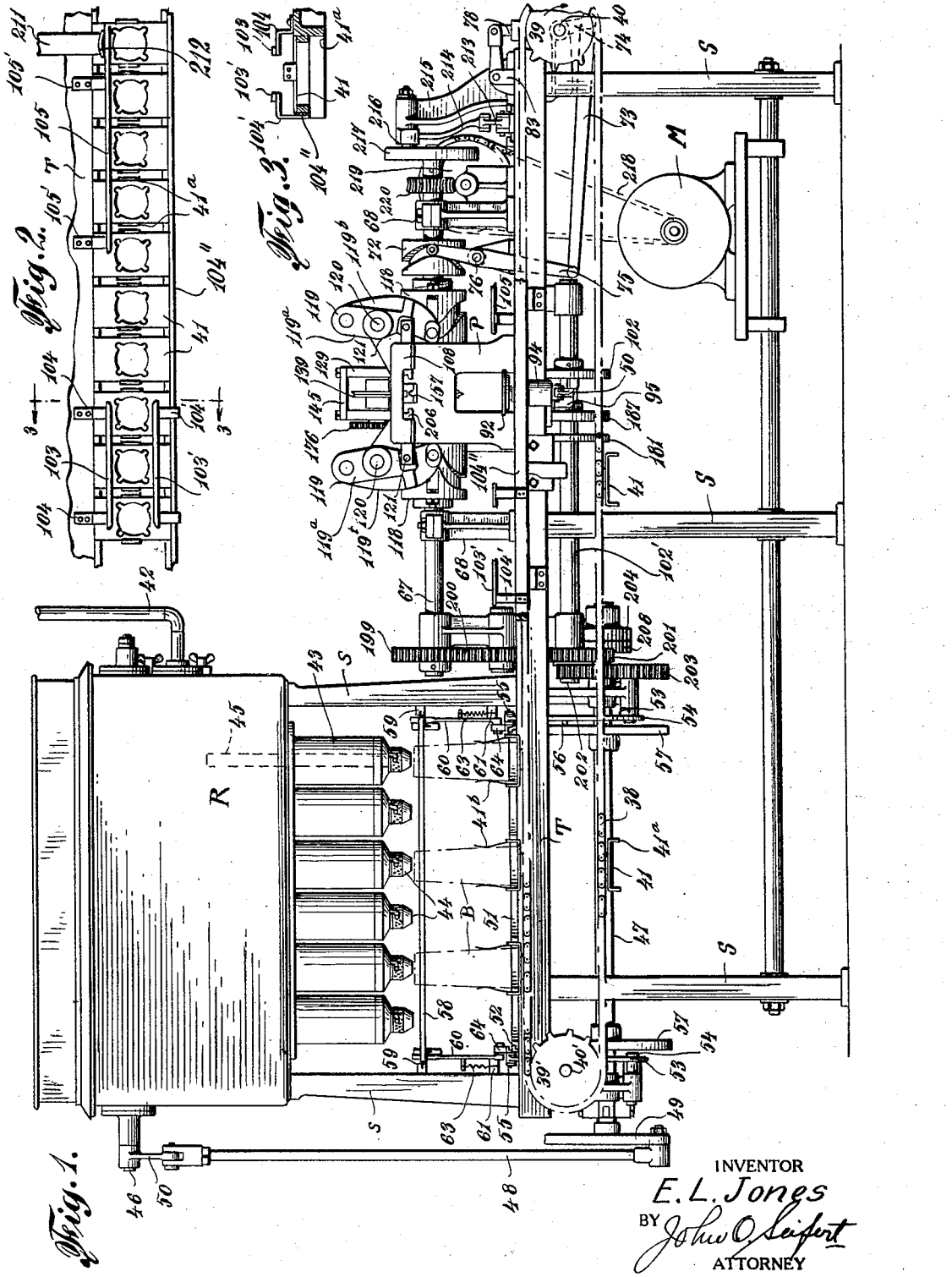
INVENTOR
E. L. Jones
BY John O. Seifert
ATTORNEY

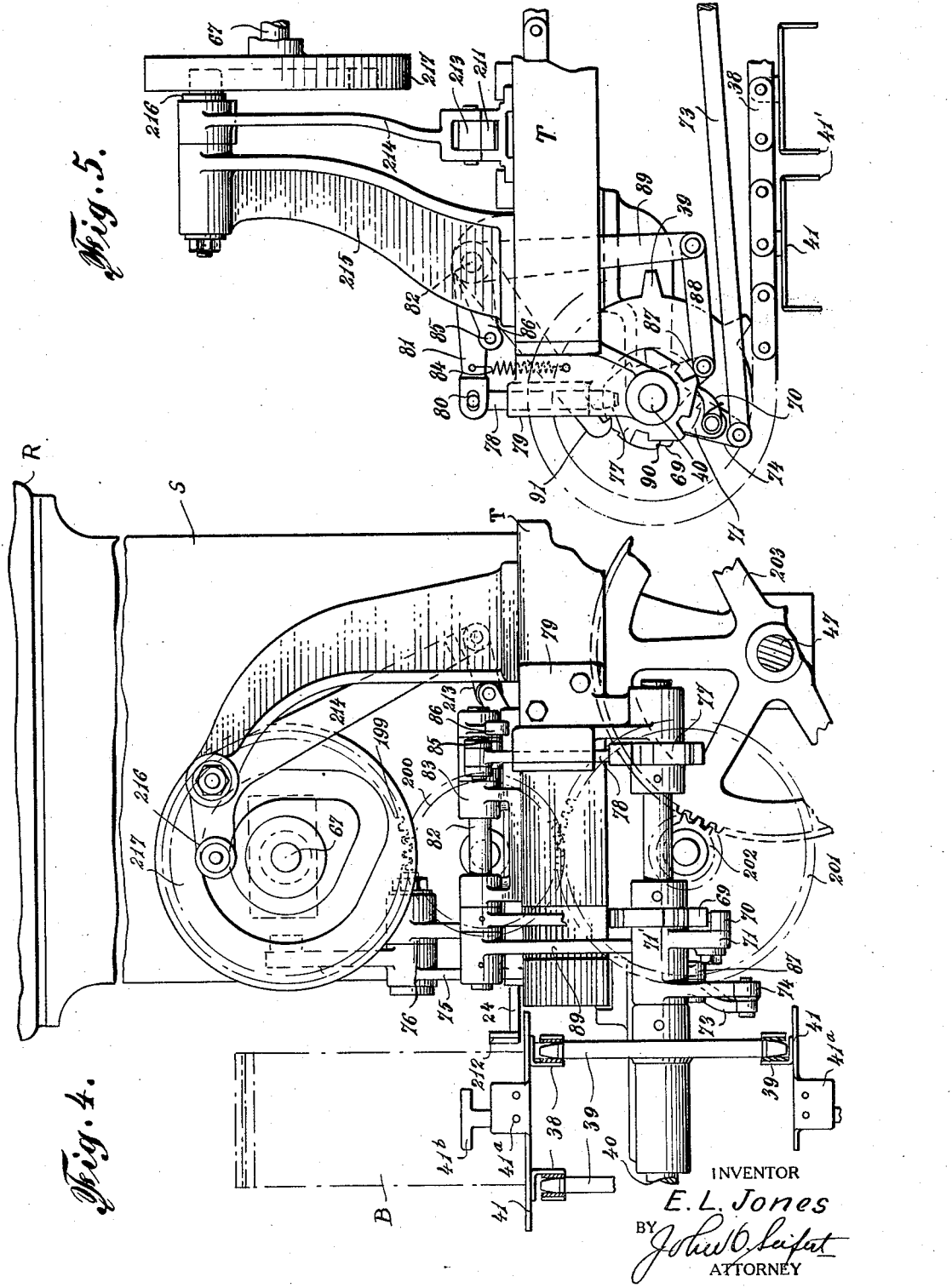

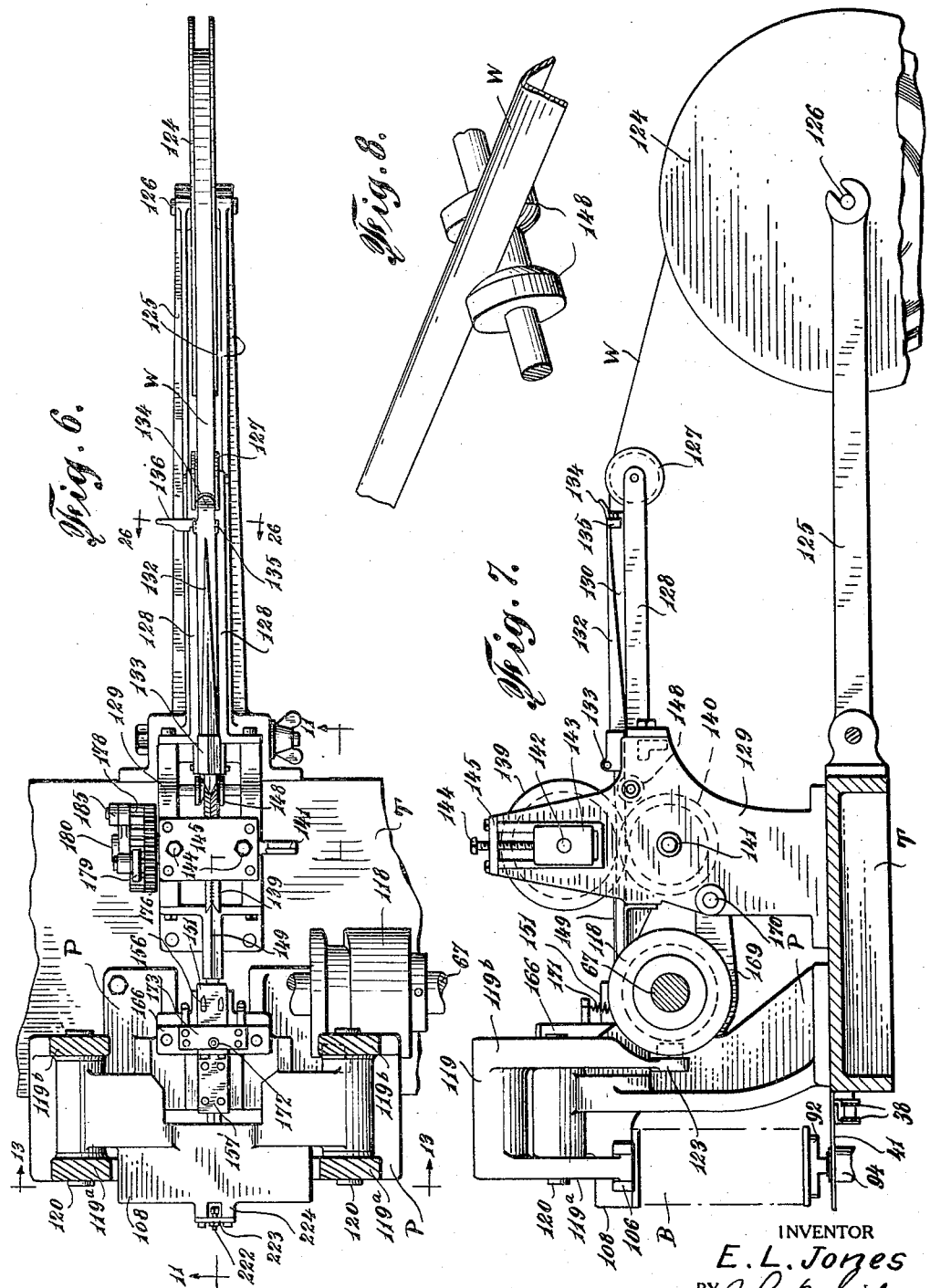

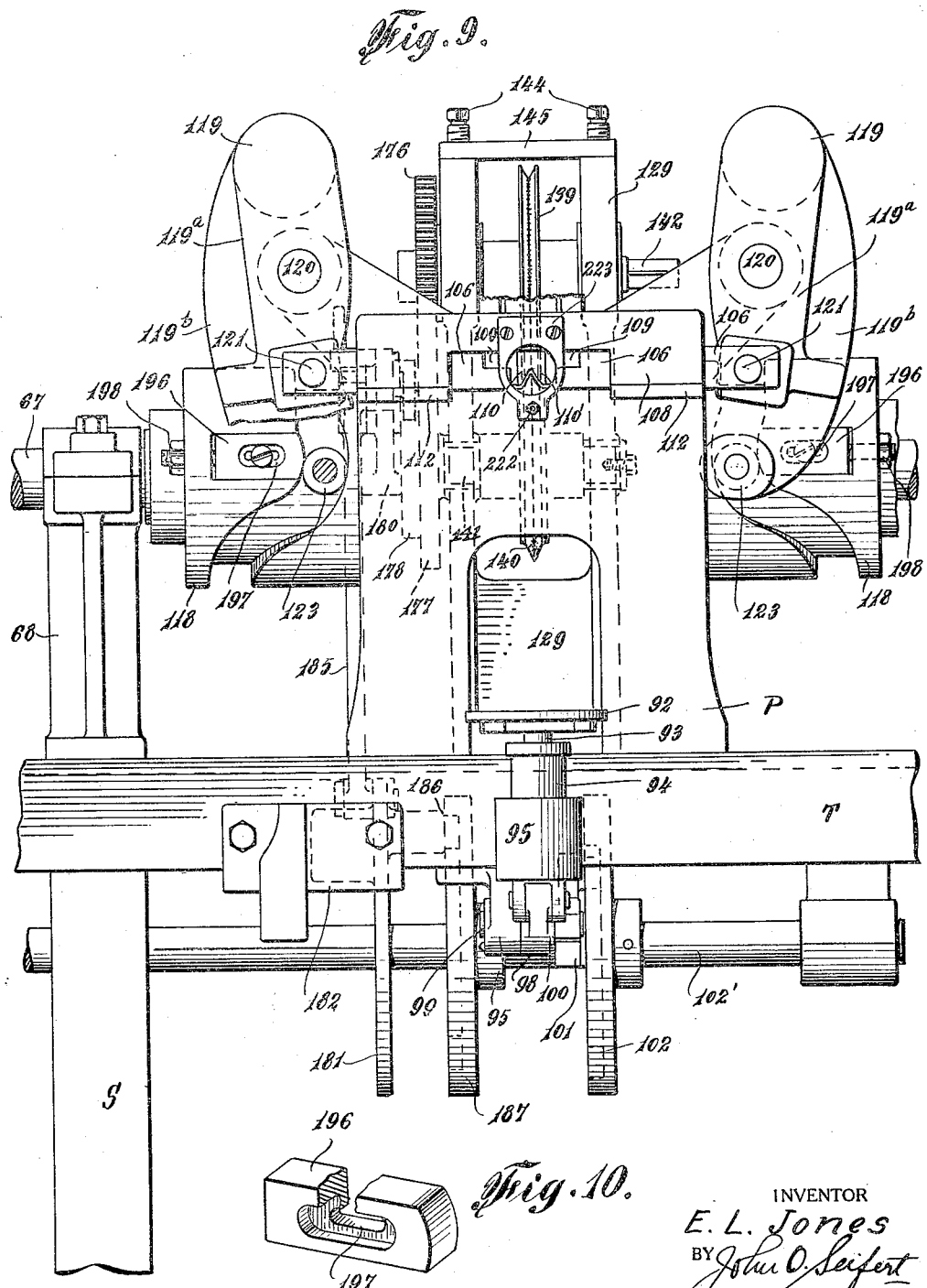

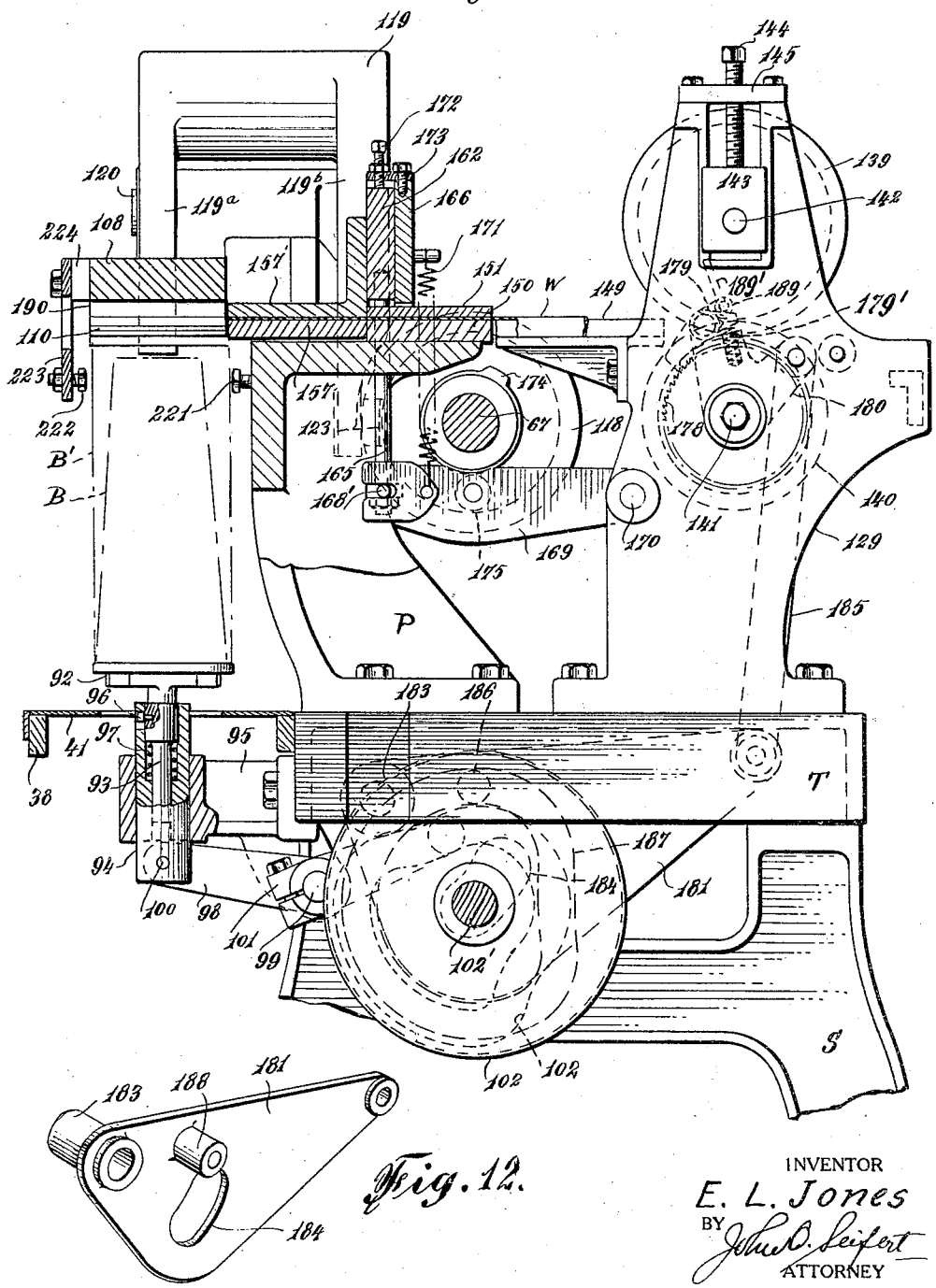

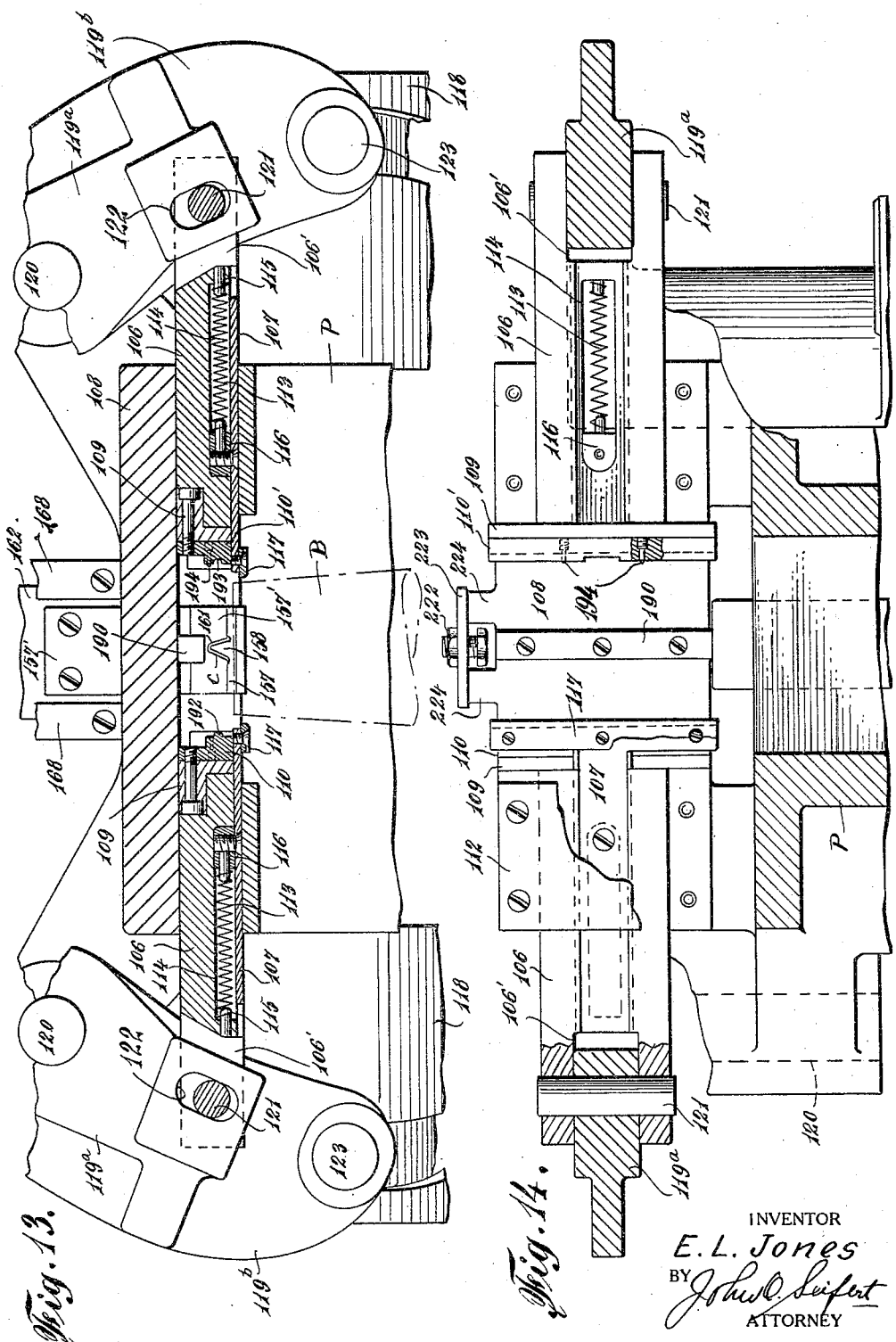

Aug. 16, 1932.  E. L. JONES  1,871,701
RECEPTACLE CLOSING AND SEALING MEANS
Filed June 16, 1928  10 Sheets-Sheet 7
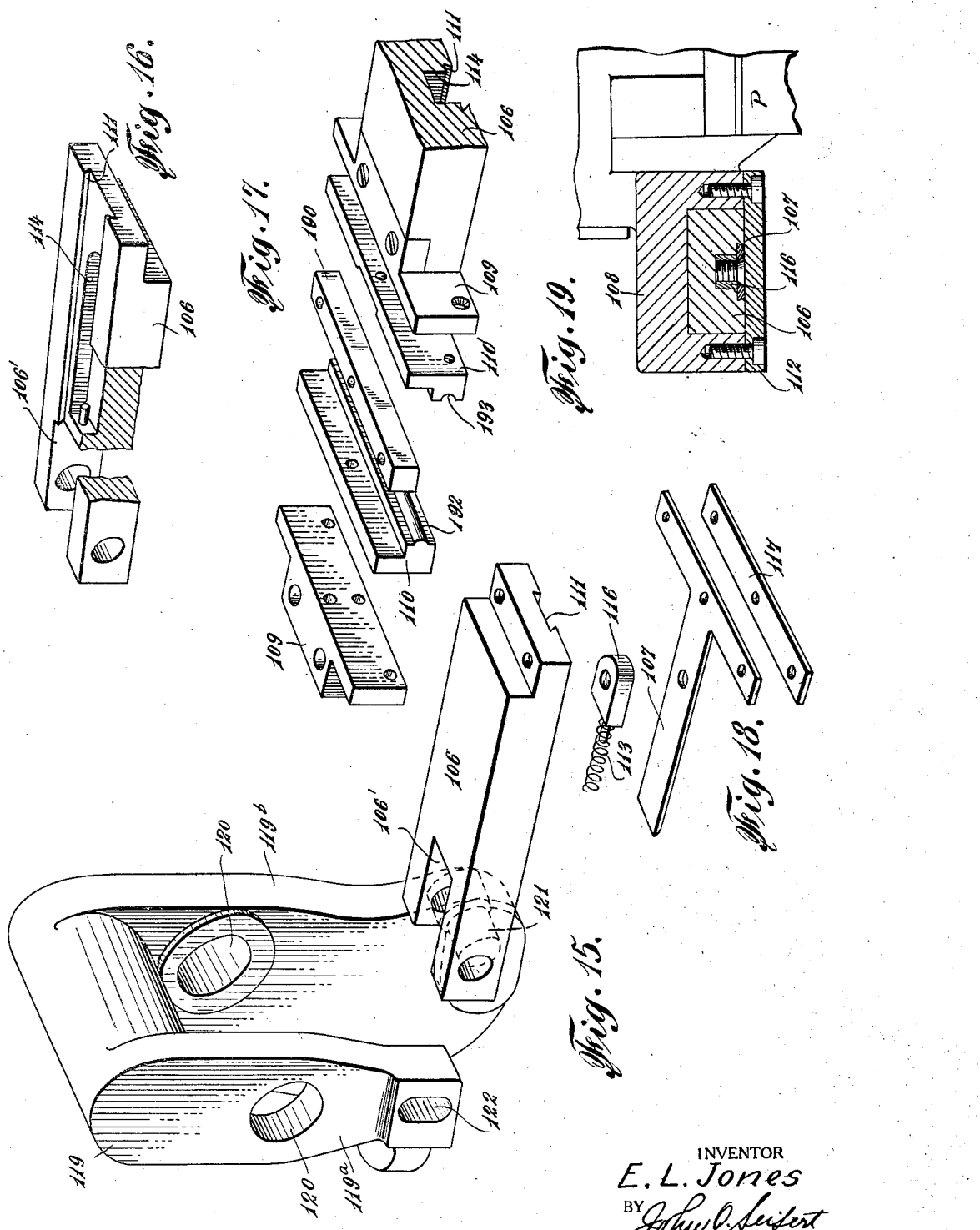
INVENTOR
E. L. Jones
BY
John O. Seifert
ATTORNEY

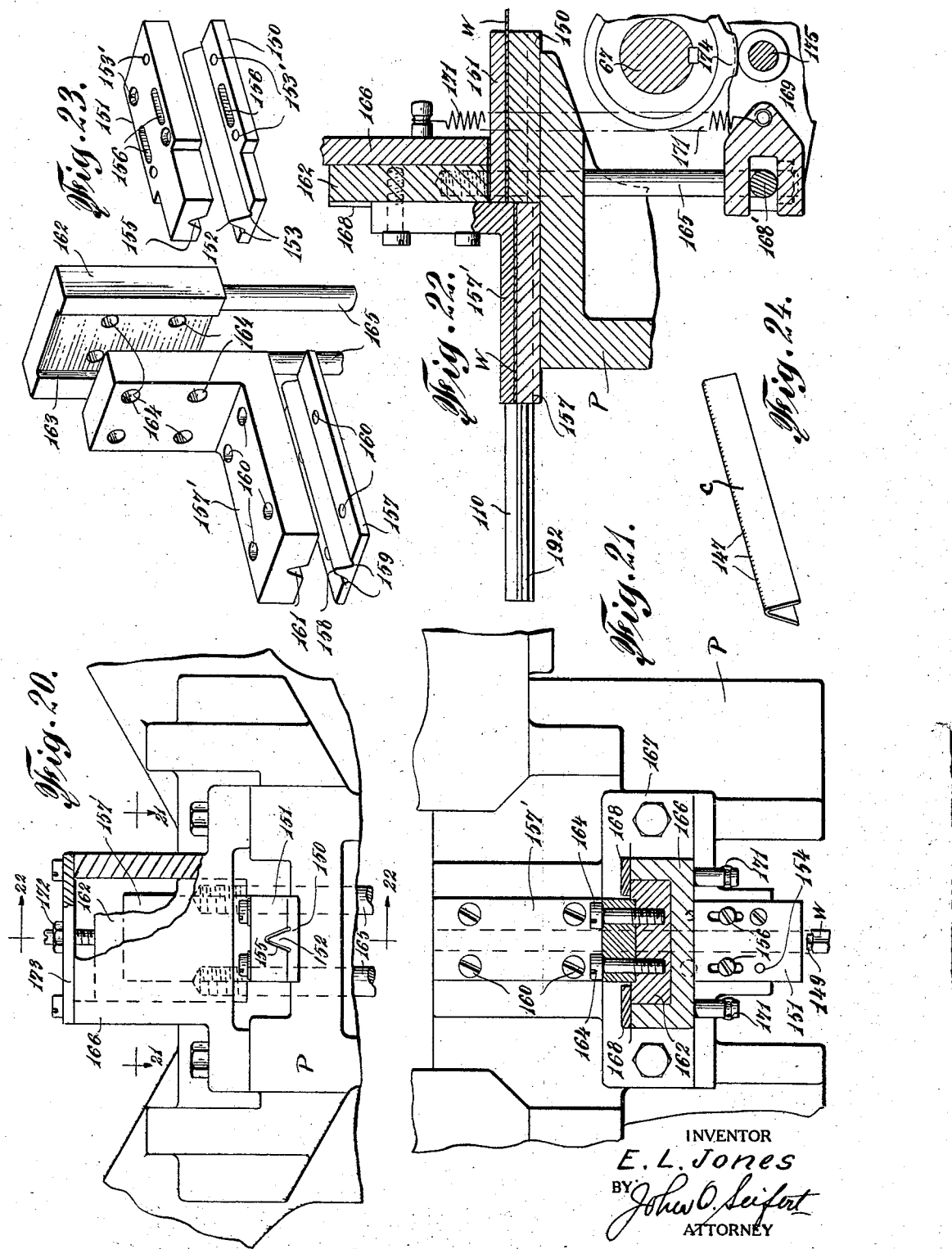

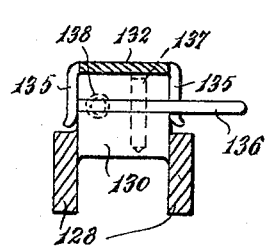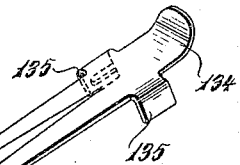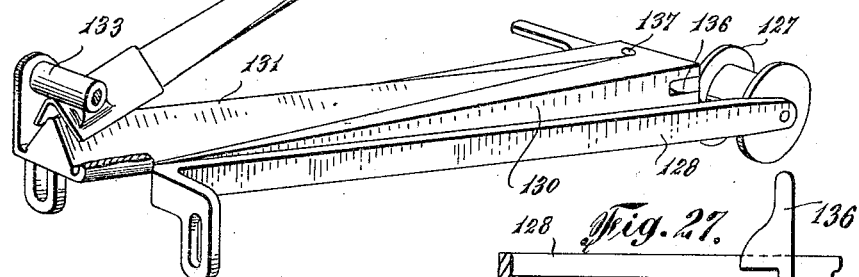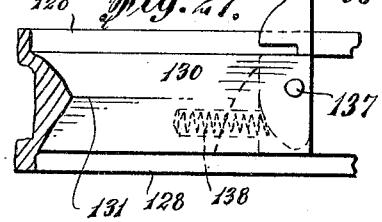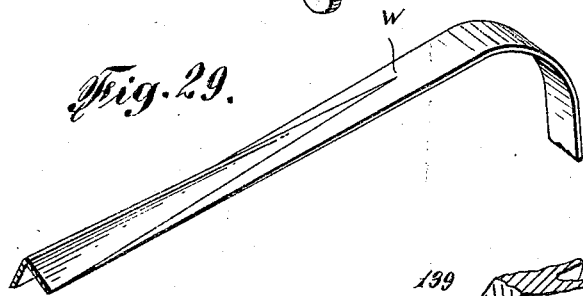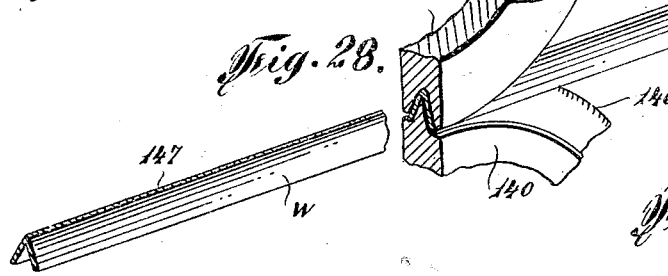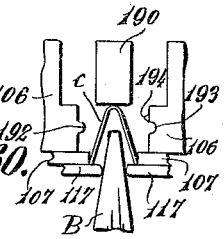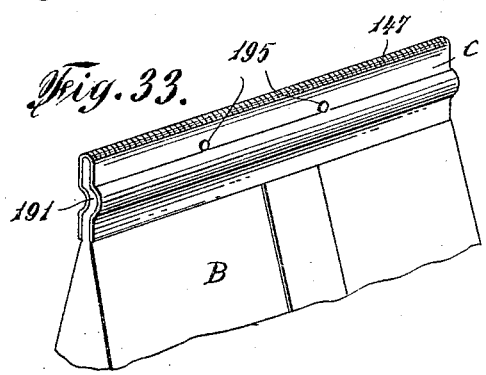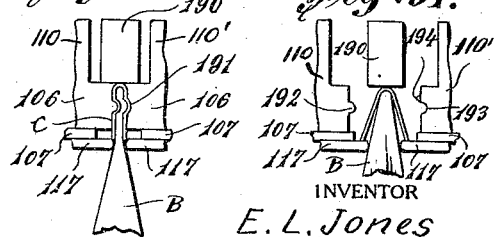

Aug. 16, 1932.　　　　E. L. JONES　　　　1,871,701
RECEPTACLE CLOSING AND SEALING MEANS
Filed June 16, 1928　　10 Sheets-Sheet 10
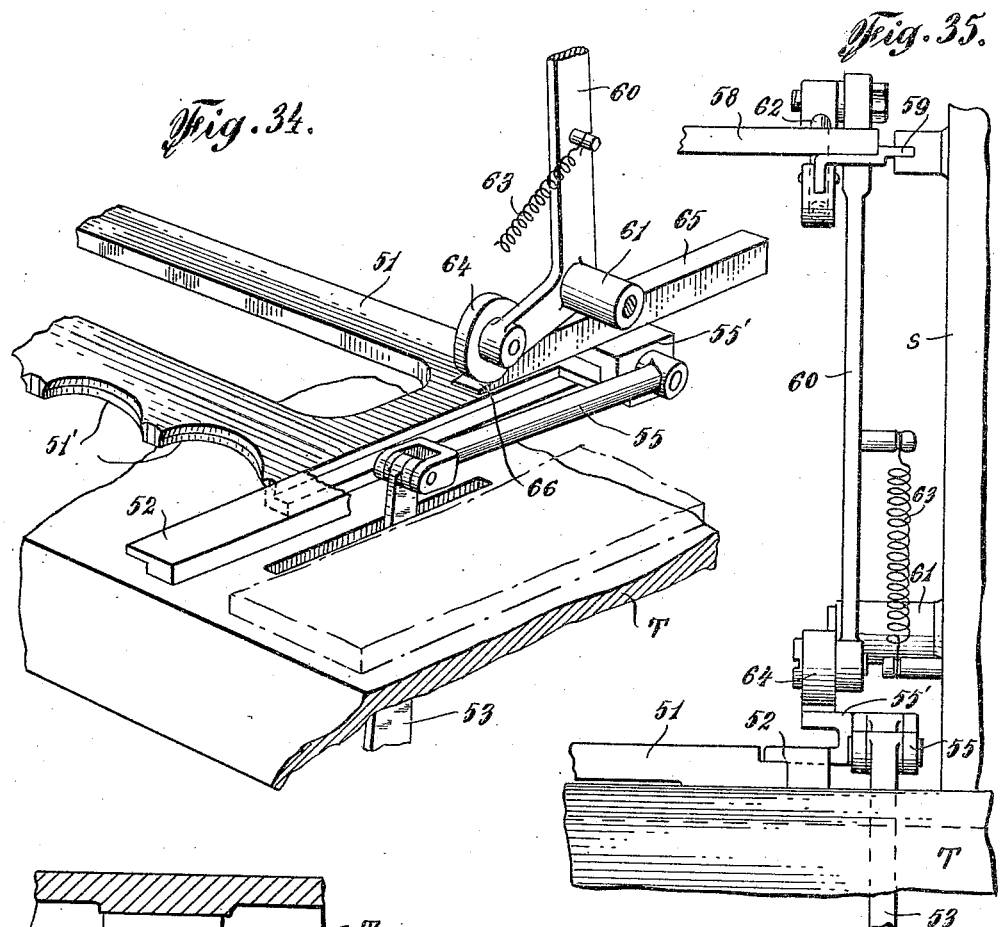
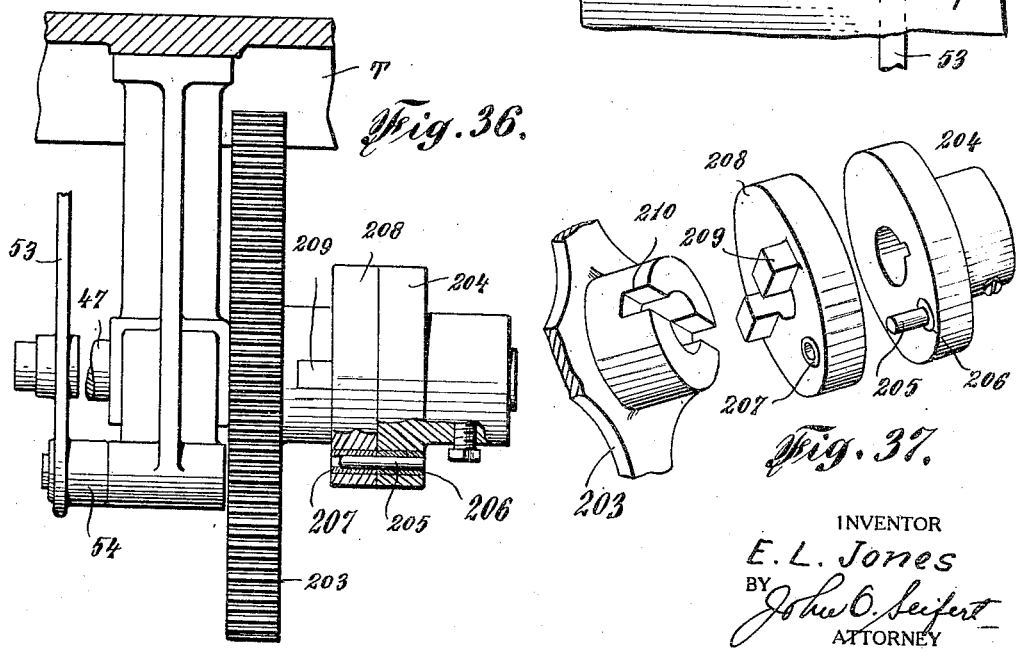
INVENTOR
E. L. Jones
BY John C. Seifert
ATTORNEY Patented Aug. 16, 1932

1,871,701

UNITED STATES PATENT OFFICE

ELLIS L. JONES, OF LONG ISLAND CITY, NEW YORK, ASSIGNOR, BY MESNE ASSIGNMENTS, TO AMERICAN SEALCONE CORPORATION, OF NEW YORK, N. Y., A CORPORATION OF NEW YORK

RECEPTACLE CLOSING AND SEALING MEANS

Application filed June 16, 1928. Serial No. 285,849.

This invention relates to apparatus for filling receptacles and for sealing the filled receptacles, the receptacles being made of pliable material, such as paper, of conical form with the mouth at the smaller end, which is collapsed or squeezed together to close the same and secured in closed condition by a sealing member of V-shape in cross section engaged over the collapsed receptacle end and clamped thereto, and it is the object of the invention to provide improved and more efficiently operating apparatus of this character for transferring filled receptacles from the filling means to a traveling conveyor and by such conveyor positioned relative to means for collapsing the receptacle end and forming and applying the sealing member to the collapsed receptacle end.

In apparatus of this character the sealing member, as stated, comprises a metallic strip formed to V shape in cross section, and it is a further object of the invention to provide means for feeding and forming the strip to V shape, severing a predetermined length of the formed strip to constitute the sealing member and position the same relative to the collapsed receptacle end, and to provide a more efficient sealing member.

Another object of the invention relates to means for collapsing the receptacle end and to apply the sealing member to the collapsed receptacle end and provide a more secure and efficient seal for the receptacle.

Other objects and advantages will hereinafter appear.

In the drawings accompanying and forming a part of this application Figure 1 is a front elevation of a receptacle filling, closing and sealing apparatus illustrating an embodiment of my invention.

Figure 2 is a plan view of a portion of the receptacle conveyor and showing guiding means for receptacles thereon in relation to the conveyor.

Figure 3 is a cross sectional view taken on the line 3—3 of Figure 2 to show the arrangement of the guide means relative to the conveyor.

Figure 4 is an end elevation of the apparatus, on an enlarged scale, looking at the right of Figure 1 with a portion of the framework and parts broken away to show the means to actuate the conveyor and a pusher for delivering sealed receptacle from the conveyor.

Figure 5 is a view looking at the right of Figure 4 of the conveyor actuating and pusher means.

Figure 6 is a plan view, partly in section, of the means for feeding a metallic strip and forming the same to V shape in cross section and the means for severing a portion from the formed strip to constitute the sealing member and showing the same in relation to the means to collapse the receptacles and apply the sealing member thereto.

Figure 7 is a sectional end elevation looking at the bottom of Figure 6.

Figure 8 is a perspective view of means to show the guiding of the primarily formed strip and the means for feeding and finally forming the strip.

Figure 9 is a front elevation, on an enlarged scale, of the means to collapse the receptacles and to apply the sealing member thereto, and also the means for presenting a receptacle from the conveyor to said receptacle collapsing and sealing member applying means.

Figure 10 is a perspective view, partly in section, of an adjustable portion in cams for actuating the receptacle collapsing and sealing member applying means.

Figure 11 is a cross sectional view, on an enlarged scale, taken substantially on the line 11—11 of Figure 6, looking in the direction of the arrows.

Figure 12 is a perspective view of a cam actuated lever for operating the strip feeding means.

Figure 13 is a sectional view, on an enlarged scale, taken substantially on the line 13—13 of Figure 6 looking in the direction of the arrows.

Figure 14 is a view looking at the bottom of Figure 13 with the parts partly broken away and in section.

Figure 15 is a detail view in perspective of a slide to carry the receptacle collapsing means and sealing member applying head and showing the same in relation to an operative lever therefor.

Figure 16 is a detail perspective view, partly in section, of the slide shown in Figure 15 looking at the bottom thereof.

Figure 17 is a perspective view of the sealing member applying means showing the same in disassembled relation.

Figure 18 is a perspective view in disassembled relation of the receptacle collapsing means.

Figure 19 is a cross sectional view of the slide shown in Figure 15 and showing the manner of mounting the receptacle collapsing means thereon.

Figure 20 is a front elevation, partly broken away and in section, of the means for guiding and supporting the sealing strip and cutter mechanism for severing a portion therefrom.

Figures 21 and 22 are sectional views taken substantially on the lines 21—21 and 22—22 of Figure 20 looking in the direction of the arrows.

Figure 23 is a perspective view of the cutter mechanism and the means to support and guide the sealing strip and showing the same in dissembled relation.

Figure 24 is a perspective view of a finished and severed portion of the sealing strip to constitute the sealing member.

Figure 25 is a perspective view of complemental die members for primarily forming the sealing strip and showing the same in inoperative relation.

Figure 26 is a cross sectional view, on an enlarged scale, of the primary strip forming means taken substantially on the line 26—26 of Figure 6 looking in the direction of the arrows.

Figure 27 is a plan view and in section of the rear portion of the lower die member shown in Figure 25.

Figure 28 is a perspective view of a portion of the means for feeding and finally forming the sealing strip and showing means to guide the primarily formed strip to said means and a portion of the finally formed strip.

Figure 29 is a perspective view of a portion of the sealing strip to illustrate the manner of primarily forming the same to V shape.

Figure 30 is an end elevation of a portion of the receptacle collapsing and sealing member applying means and showing the manner of supporting a sealing member delivered over the collapsed receptacle end and in relation to a gauge member.

Figure 31 is a view similar to Figure 30, but showing the collapsed receptacle in position relative to the sealing member preparatory to clamping the sealing member thereto.

Figure 32 is a view similar to Figure 31 but showing the sealing member applying means as having been actuated and clamping the sealing member to the collapsed receptacle end.

Figure 33 is a perspective view of the upper portion of a receptacle showing the sealing member applied thereto.

Figure 34 is a perspective view, on an enlarged scale, of a portion of the means for transferring filled receptacles from the filling means to the conveyor for transport to the receptacle collapsing and sealing member applying means.

Figure 35 is a front elevation of the parts shown in Figure 34.

Figure 36 is a front elevation, partly in section, of a portion of the actuating means for the receptacle transferring means shown in Figure 34 and showing means for coupling driving means thereto; and Figure 37 is a perspective view of the coupling means disassembled for connecting the receptacle transferring means to its driving means.

In carrying out the invention the operative means are mounted upon a table T supported by suitable standards S, receptacle filling means being mounted upon one end portion of said table, and means to feed and form a metallic strip to V shape in cross section, sever a portion from said strip to constitute the sealing member, and the means to which the filled receptacles are presented for collapsing the open end of the receptacle and applying a sealing member thereto being mounted upon the opposite end portion of the table. An endless receptacle transporting conveyor comprising a pair of sprocket chains 38 is supported by sprocket wheels 39, 39′ fixed to shafts 40, 40′ rotatably supported at opposite ends of the table and arranged so that the upper stretch of the conveyor will travel in a plane coincident with the top of the table. The conveyor chains are arranged with receptacle supports in the form of plates 41 fixed at the opposite ends to the chains and each having a central opening with ears 41$^a$ formed at the opposite longitudinal marginal portions and intermediate the ends thereof bent to extend outwardly at a right angle to the plates, said ears being arranged centrally between the chains and at diametrically opposite sides of the plate openings. Receptacle engaging fingers 41$^b$ of resilient material are fixed to and extend upward from the ears 41ª, the receptacle engaging portion of said fingers being of arcuate shape to conform to the wall of the receptacle and having the ends flared outward to facilitate the engagement of a receptacle between the fingers and the delivery of a receptacle therefrom.

The receptacle filling means may be of any approved form, and as shown embodies a reservoir R to contain the liquid with which the receptacles are to be filled, in the present instance milk, said reservoir being connected by a pipe 42 with a source of supply. The reservoir is supported superposed to the table by standards s, and a series of alined cup members 43 are connected to and extend from the bottom of the reservoir and are arranged with discharge nozzles or nipples 44 with tubes 45 fixed in the cups in communication with the discharge nozzles and extending up into the reservoir above the level of the liquid therein through which the liquid is delivered by means of dippers (not shown) mounted to have movement thereon into and out of the cups and adapted to deliver the liquid therefrom into the top of the tubes, suitable float controlled valve mechanism (not shown) being arranged in the tank to regulate the discharge of the liquid through the pipe 42 and maintain the liquid in the reservoir at a predetermined level. The dippers are operatively connected with a rock shaft 46 and through the actuation of said shaft moved along the tubes 45. The rock shaft 46 is actuated from a driven shaft 47 journaled in hangers fixed to the bottom of the table, said shaft being connected with the rock shaft 46 by a rod 48 pivotally connected at one end to a disk 49 fixed on the shaft 48 eccentric to the axis of said disk and at the opposite end pivotally connected with an arm 50 fixed to the rock shaft 46.

The receptacles B to be filled are placed on the table and positioned in register with the nozzle outlets 44 by gauge means in the form of a frame 51 (Figures 1, 34 and 35) having arcuate recesses 51' in the front edge for the engagement of the receptacles and the centers of which recesses in the normal position of the frame are in line with the centers of the cups 43. The frame is also adapted as means to transfer the receptacles from the table, in the present instance to the seats 41 of the receptacle transporting conveyor, and then returned to initial position. For this purpose the frame is slidably mounted at the ends in gibs 52 fixed upon the table, and is actuated from the shaft 47 by a pair of levers 53 pivotally supported at one end from an arm extended laterally from the hangers for the shaft 47, as at 54, the opposite ends extending through slots in the table and pivotally connected with rods 55 pivotally connected with blocks 55' fixed to the opposite rear corners of the frame, the levers being actuated by rollers mounted on studs fixed to and extending laterally from the levers, as at 56, engaging in a cam groove in one face of disks 57 fixed to the shaft 47.

To catch the drippings from the nozzles as the receptacles are transferred from the table and thus prevent soiling of the table a pan 58 is slidably mounted at opposite ends in members fixed to the reservoir supporting standard s, as at 59. Means are provided to move the pan to position below the nozzles when the frame is actuated to transfer the receptacles from the table and away from said nozzles when said frame is positioned to receive receptacles and register them in alinement with the nozzles to permit filling of the receptacles, said means comprising levers 60 pivotally mounted at 61 upon the reservoir supporting standards, one arm of each of which levers is connected by a rod 62 with the pan. The levers are urged by springs 63 in a direction to move the other lever arms toward the frame for engagement of rollers 64 carried thereby with rails 65 fixed to and extending rearwardly from the frame, the upper forward edge of which rails are beveled to form cam surfaces, as at 66, down which the rollers are caused to ride and the pan moved away from the discharge nozzles when the frame is moved to its rearmost position by the springs thereby rocking the levers to move the pan away from the discharge nozzles, and as the frame is moved forward to transfer the receptacles from the table the rollers ride up said cam surfaces and move the pan to and retain it in position below the nozzles.

As stated, the receptacles are of conical form and made of pliable material, such as paper paraffined, and to close the same the open end is collapsed or squeezed together and sealed in collapsed condition by a clamping member engaged over and sealed to the collapsed receptacle end. The conveyor is intermittently operated to successively position receptacles transported thereby to the means to collapse the receptacles and apply a sealing member to the collapsed receptacle end, the actuation of the means to transfer the receptacles from the filling means to the conveyor being timed so that said means is actuated upon a predetermined number of movements imparted to the conveyor, in the present instance six movements and equal to the number of receptacles filled at the same time. The conveyor is actuated by pawl and ratchet mechanism operated from a drive shaft 67 journaled in bearing members 68 fixed upon the table, said pawl and ratchet mechanism (Figures 1, 4 and 5) comprising a ratchet wheel 69 fixed to the sprocket wheel carrying shaft 40 and a spring influenced pawl 70 pivotally carried by an arm 71 extending laterally from a sleeve 71' loosely mounted on the shaft 40 and interposed between the ratchet wheel and a sprocket wheel, the arm carrying sleeve being operatively connected to and oscillated from a cam 72 fixed upon the drive shaft by a link 73 pivotally connected at one end to a second arm 74 on the sleeve 71' and at the opposite end pivotally connected with one arm of a lever 75 pivotally mounted on a bracket fixed upon the framework, as at 76, the other arm of the lever carrying a cam following roller to cooperate with the cam 72. It will be obvious that as the pawl carrying arm 71 is moved in one direction that the pawl will ride over the ratchet wheel and when moved in the opposite direction that the pawl will engage a tooth in said wheel and advance the same, and thereby the conveyor. It is essential that when the conveyor is stopped after each movement that the same be accurately positioned relative to means, hereinafter described, to lift a receptacle from the conveyor and present it to the receptacle collapsing and sealing member applying means, and means are therefore provided to prevent overthrow of the conveyor actuating means comprising a disk 77 fixed to the sprocket wheel shaft 40 having notches equidistantly spaced about the periphery for the engagement of a detent pin 78 slidably mounted for vertical movement in a bracket 79 fixed to the end of the table, said detent being carried by and having a pin and slot connection 80 with an arm 81 loosely mounted on a shaft 82 rotatable in a bracket 83 fixed upon the table, the pin being urged in a direction toward the disk 77 by a spring 84 attached to the pin carrying arm and a fixed part of the framework. The disk 77 is so positioned on the shaft 40 that a notch therein will be opposite the detent pin at the terminus of a conveyor advancing movement of the ratchet wheel 69 and in position for the engagement of the detent 78 in a disk notch. As return movement is imparted to the pawl carrying arm 78 through its connection with the cam 72 the detent is moved out of the disk notch by a pin 85 engaging below the detent carrying arm 81, said pin being fixed in and extending laterally from an arm 86 fixed to the shaft 82, said arm being moved to lift the detent out of the disk notch by an arm 87 extending laterally from the sleeve 71' carrying the pawl carrying arm 71 and connected with the shaft 82 by a link 88 connected with an arm 89 fixed to the shaft 82. The detent pin when it is moved out of the disk notch moves along a flat portion 90 arranged between the disk notches. As a further means to prevent overthrow of the ratchet wheel a second arm 91 is fixed to the shaft 82, said arm being positioned and arranged with a pallet to engage ratchet teeth in the ratchet wheel 69 arranged oppositely to the ratchet teeth in said wheel with which the pawl 70 engages and adapted to engage with said teeth when the ratchet wheel terminates its conveyor advancing movement, and moved out of engagement with said tooth at the commencement of the return movement of the pawl carrying arm 74.

The conveyor is brought to rest with the opening in a receptacle support 41 in line with means to pass through such opening and engage the bottom of the receptacle to lift it from the support and elevate it to present it to the means for collapsing the receptacle end and applying a sealing member thereto. This means comprises a head 92 fixed to a plunger or stem 93 having portions of two different diameters and slidably mounted in a bore having correspondingly formed diameters in a sleeve 94 slidably mounted in a bracket 95 fixed to and extending from the table below the upper stretch of the conveyor, (Figures 1, 9 and 11,) the head carrying stem having movement relative to the sleeve which is limited by a pin 96 fixed in the stem engaging in a slot in the sleeve (Figure 11) and the stem urged in an outward direction by a spring 97 coiled about the stem portion of less diameter within the bore of the sleeve of larger diameter and confined between the stem portion of larger diameter and the sleeve bore of less diameter. The sleeve is positively actuated by an arm 98 fixed to a rock shaft 99 rotatably mounted in a downwardly extending arm of the bracket 95, the end of said arm engaging in a bifurcation at one end of the sleeve and pivotally connected thereto, as at 100, and the shaft 99 rocked by a second arm 101 fixed to the shaft and carrying a roller engaging in a cam groove in the face of a disk 102 fixed to a shaft 102' journaled in hangers fixed to the bottom of the table.

As the receptacles approach said receptacle lifting means by the travel of the conveyor they are guided between a pair of rails 103, 103' arranged above the lateral marginal portions of the conveyor and to engage at opposite sides of the receptacles, (Figure 2,) the guide rail 103 being carried by angle brackets 104 fixed upon the table and extending upwardly and laterally thereof, and the rail 103' being fixed upon brackets 104' fixed to a sill 104" suitably carried by the framework and extending longitudinally of the outer side of the upper conveyor stretch, said brackets extending upwardly at the outer side of the conveyor and then inwardly over the conveyor, as clearly shown in Figure 3. A further guide rail 105 is provided at the terminal portion of the travel of the upper stretch of the conveyor, said rail being carried by brackets 105' to extend over the inner marginal portion of the conveyor.

The receptacle collapsing and sealing member applying means comprises two pairs of slides 106 and 107, respectively, (Figures 13 to 19, inclusive,) the slides 106 being carried by a portion 108 (Figure 11) overhanging the conveyor of an arched pillar P fixed upon the table, and the slides having reciprocatory movement toward and away from each other in the direction of travel of the conveyor, the termination of the inward movement of the slides being at a point at the opposite sides of a line extending vertically through the axis of the receptacle lifter 92. Heads 109 are fixed at the inner ends of the slides 106, said heads having jaws 110, 110' fixed to the opposed faces thereof for clamping the sealing member to the collapsed receptacle end. (Figures 15, 16 and 17.) The slides 107 constitute the receptacle collapsing slides and are carried by the slides 106 to permit of said later slides to have independent movement relative to the slides 107. The slides 107 are substantially of T-form, as shown in Figure 18, the opposite longitudinal edges of which are beveled in a direction toward each other to slidably engage in a slideway 111 in the bottom of the slides 106, the opposite walls of which are in the nature of gibs and beveled to correspond to the bevel of the lateral edges of the body of the slides 107, and said slides retained in the slideways by plates 112 secured to the bottom of the overhanging portion 108 of the pillar P, as shown in Figure 19. The head portion of the slides 107 extends forward of the ends of the slides 106 in predetermined relation to the jaw carrying heads and the jaws carried thereby, as shown in Figure 13, and yieldingly urged to said position by springs 113 confined in elongated recesses 114 in the bottom of the slides 106 with one end of the springs abutting against an end wall of said recesses with a pin fixed in said ends of the recesses extending into the spring coils, as shown at 115, the opposite ends of the spring abutting against blocks 116 fixed to the slides 107 and slidably engaging in the recesses 114 with pins fixed in said blocks engaging in the end coils of the springs, the movement of the blocks being limited by engagement with the end of the recesses. A plate 117 is secured to the bottom of each of the head portions of the slides 107, as by screws, with a longitudinal marginal portion thereof extending forward of the slide heads, as clearly shown in Figure 13, to constitute the receptacle engaging portion of said slides 107 and for a further purpose to be hereinafter described.

The slides are actuated by a pair of cams 118 fixed on the drive shaft 67, in the form of rollers having cam grooves cut into and extending circumferentially about the periphery thereof, and through levers 119 having an operative connection with said cams and pivotally supported upon upwardly extending and diverging arms of the pillar P, as at 120. (Figures 1, 6, 7, 9, 11 and 13.) The levers comprise a pair of parallelly extending arms 119$^a$, 119$^b$ integrally connected at one end. (Figure 15.) The slides 106 are pivotally connected with the arms 119$^a$ by engaging the terminal portion of said arms in a bifurcation 106' and a pin 121 fixed in perforations in the bifurcation legs and extended through an elongated perforation 122 in the lever arms 119$^a$. The lever arms 119$^b$ are of greater length than the arms 119$^a$ and said levers are operatively connected with the cams 118 by cam following rollers mounted on studs fixed in said lever arms engaging in the cam grooves, as at 123. It will be obvious that by the rotation of the cams and the engagement of the cam following rollers 123 in the cam grooves that oscillatory movement will be imparted to the levers 119 which will be transmitted to reciprocatory movement of the slides.

To provide a sealing member to be clamped to the collapsed receptacle end a roll 124 of a metallic strip or web W is rotatably supported between a pair of arms 125 fixed to and extending laterally from the table by a pivot pin extended through the axis of the rail and engaged in bifurcations in the ends of the arms, as at 126. (Figures 6 and 7.) The strip is guided over and between the flanges of a roller 127 rotatably mounted on a pin between a pair of arms 128 fixed to and extending laterally from a pair of parallel and vertically extending members of a frame 129, (Figures 6, 7 and 25,) said arms being arranged at opposite sides of and fixed to a die block 130, or they may be in the form of ribs integral with the die block 130, and extending beyond the end thereof. The upper surface of the block is arranged with a rib portion 131 of progressively increasing inverted V shape in cross section from the outer end to the connection thereof with the frame 129, as clearly shown in Figure 25. A complemental die member in the form of a plate 132 shaped in cross section to conform to the rib 131 of the die block is pivotally supported at one end between a pair of ears extended upward from opposite sides of the inner end of the die block, as at 133, the opposite end being curved laterally to form a finger grip 134 whereby to move the same toward and away from the die block, the die plate at said end adjacent the fingerpiece being arranged with ears 135 extended laterally from opposite sides and bent substantially at a right angle to the plate, said ears being adapted to engage at opposite sides of the die block and serve as guides for the strip between said die members. The die plate 132 is retained in operative relation to the die block 130 by a latch 136 engaging in a recess in the end of the die block and pivotally mounted on a pivot pin 137 and normally urged outward by a spring 138 seated in a recess in the die block in line with the latch engaging recess the latch extending transversely of the die block with a portion arranged with a finger grip extending laterally of the die block, as shown in Figures 25 and 26, said extended latch and engaging in a recess in the die plate ear 135 at said side of the die block. The strip or web will be primarily formed substantially to the shape shown in Figure 9 by drawing between the dies. The strip is drawn from the roller 124 between the die blocks 130 and 132 by a pair of feed rollers 139, 140, said rollers being also arranged to shape the strip to final form. The roller or wheel 140 is arranged between the frame members 129 and fixed to a shaft 141 rotatably mounted in said frame members with one end extended from one of said frame members and arranged for the application of a wrench, as shown in Figure 6, whereby to rotate the feed rollers in threading the strip between the same. The other roller 139 is rotatably supported in the frame members 129 to have adjustment toward and away from the roller 140. For this purpose the wheel is fixed to a shaft 142 rotatably mounted in blocks 143 slidably mounted in bifurcations in the upper ends of the frame members and adjusted in a direction toward the roller 140 by set screws 144 threaded into a plate 145 fixed to the top of the frame members. The periphery of the roller 140 is of V shape in cross section and the periphery of the roller 139 has a recess therein shaped to conform in cross section to the periphery of roller 140 and in which recess the peripheral portion of roller 140 engages. The apex of the periphery of the roller or wheel 140 is arranged with transverse serrations 146, (Figure 28,) and the bottom of the peripheral recess in the roller 139 is arranged with corresponding serrations to serve not only as a gripping means to facilitate the feeding of the strip but also to arrange the strip as it is formed with corresponding serrations and reinforce the formed strip at the fold or bend, as shown at 147 in Figures 28 and 33. The primarily formed strip is guided from the die members 130, 132 to the feeding and final forming rollers 139, 140 by a pair of rollers 148 by engaging between opposed conical faces of said rollers, as shown in Figure 8, said rollers being fixed to a shaft rotatably mounted in the frame members 129 in interposed relation between the die members and feed wheels or rollers. The finally formed clamping strip is delivered by the feed rollers to a guide member 149 fixed to and extending forward from the frame members 129, said guide having a cross sectional shape to conform to the shaped strip. The strip is guided by the guide 149 to cutter mechanism for severing a predetermined length of the finally formed strip to constitute the sealing member c as shown in Figure 24.

The strip cutter mechanism (Figures 11 and 20 to 23) embodies a fixed cutter element and a cutter element reciprocatory transversely of the direction of the feed of the strip and of the fixed cutter element. The fixed cutter element comprises a pair of blocks 150, 151, the block 150 being arranged on the upper surface with a rib 152 extending longitudinally and centrally of the block, said rib being of V shape in cross section to conform to the finally formed strip, and the block at the juncture of the rib therewith being undercut, as at 153, the one end of the block, the end at the left as viewed in Figures 11, 22 and 23, constituting a cutting edge. The block 151 is superposed to the block 150 and the both blocks having alined perforations 153′, screws being engaged in certain of said perforations in the block 151 and threaded into registering perforations of the other block to secure the blocks together and registering pins engaged in the other perforations, as shown at 154 in Figure 21. The block 151 has a recess 155 extending longitudinally and centrally of the under or mating face of the block, said recess being of inverted V shape in cross section to conform to the shape of the rib 152 of the other block, but being of slightly greater cross sectional area to provide a channel between the walls of the recess and the rib of a width substantially the same or slightly greater than the thickness of the metal of the strip and into which channel the strip is delivered by the feeding wheels or rollers, the strip being supported at the longitudinal edges engaging in the undercut portions 153. The connected cutter blocks are secured upon the pillar P by screws passed through elongated openings in the blocks and threaded into the pillar to permit of longitudinal adjustment of the cutter element, as at 156.

The reciprocatory cutter element comprises a pair of blocks 157, 157′ of a length equal to the length of the strip to be severed and constituting the sealing member, as shown in Figure 24, said block being also arranged on the upper surface with a longitudinal and centrally extending rib 158 of inverted V shape in cross section to conform to the cross sectional shape of the finally formed strip, the block at the juncture of said rib therewith being undercut, as at 159, for the engagement and supporting of the strip at the longitudinal edge portions. The other cutter block 157′ is of right angle shape in longitudinal section, one angle portion being of a length equal to the length of the block 157 and secured in superposed relation to the latter by screws passed through openings in said block portion and threaded into the block 157, as at 160, said portion of the cutter block 157′ having a recess 161 in the mating face extending longitudinally and centrally thereof, said recess being also of inverted V shape in cross section to conform to and of a slightly greater cross sectional area than the rib 158 to also provide a channel between the walls of the recess and rib substantially equal to or slightly greater than the thickness of the metal of the strip. To one end of the block, the end at the right as viewed in Figures 11, 22 and 23, constitutes a cutter edge to co-operate with the opposed edges of the blocks 150, 151 to shear off the portion of the strip engaged in the channel between the rib 158 and recess 161. The cutter element 157, 157' is fixed to and carried by a head 162 of rectangular shape in cross section by engaging one angle portion of the cutter block 157' in a recess 163 extended longitudinally through one face of the head by passing screws through perforations in said portion of the cutter block and threading the same into registering perforations in the head, as at 164. The head is carried by a pair of rods 165 slidably engaged in openings in the pillar P at opposite sides of the cutter elements with the head engaged in a slideway of corresponding shape in cross section in a face of a vertical portion 166 of a member 167 fixed upon the pillar P and bridging the fixed cutter element, the head being retained in said slideway by gauge plates 168. (Figure 21.)

The head carrying rods 165 are connected, as at 168', with a lever 169 pivotally mounted at 170 on the frame 129, said lever with the head being normally urged by springs 171 attached at one end to the lever and at the opposite ends to pins extending laterally from the vertical portion 166 of the member 167 with the reciprocatory cutter element carrying head 162 engaging an adjustable abutment in the form of a set screw 172 threaded into a plate 173 fixed to the top of the member 166, said abutment being adjustable for the purpose of alining the strip engaging channel between the blocks of the reciprocatory cutter element with the strip engaging channel between the blocks of the fixed cutter element. The lever 169 is actuated against the tension of the springs 171 to impart strip severing movement to the reciprocatory cutter element by a cam 174 fixed on the shaft 67 engaging a roller 175 mounted on a pin fixed in and extending laterally from the lever.

To feed a predetermined portion of the sealing strip the feeding rollers 139, 140 are positively driven one from the other by a gear 176 (Figures 1 and 9) fixed to the shaft of roller 139 to rotate therewith, said gear meshing with a gear 177 (shown in dotted lines in Figure 9) fixed to the shaft 141 upon which the feed roller 140 is fixed. The shaft 141 is driven by pawl and ratchet mechanism comprising a ratchet wheel 178 fixed to the roller shaft 141 with the teeth of which a pawl 179 co-operates, said pawl being pivotally mounted on one arm of a bell crank lever 180 loosely supported on the shaft 141. The pawl carrying lever is actuated by a lever 181, in the form of a triangular plate (Figures 9, 11 and 12) pivotally supported at one end from a bracket 182 fixed to the framework by a trunnion 183 extending laterally from the lever with the shaft 102' extended through an arcuate opening 184 in the lever plate 181, and connected at the opposite end with the pawl carrying lever 180 by a link 185, said lever being rocked and thereby the pawl carrying lever oscillated by a roller 186 engaging a cam groove in a disk 187 fixed on the shaft 102', said roller being carried by a stud fixed in a boss 188 extended laterally from the plate in a direction opposite to the trunnion 183. To cause the pawl to engage the teeth of the ratchet wheel a spring influenced abutment 179' is slidably mounted in a recess in the pawl carrying arm of the lever. To maintain the pawl out of operative relation with the ratchet wheel and prevent actuation of the feeding means through the operation of the pawl carrying lever a roller 189 is rotatably carried by an ear extending laterally from the lever arm, said roller having a flat cut away portion and when positioned with said flat portion opposite the end of the pawl the pawl is adapted to be positioned in operative relation with the ratchet wheel, and when adjusted so that a circular portion of said roller engages the pawl it is moved and held out of engagement with the teeth of the ratchet wheel, said roller being adjusted by an actuating rod 189' fixed in and extending laterally from the roller.

In the operation of the apparatus as the conveyor is brought to rest the receptacle lifter 92 is actuated to position the open end of the receptacle between the collapsing slides 107 when said slides are actuated with the slides 106 so that the plates 117 carried by the slides 107 engage the receptacle at opposite sides and squeeze the opposite wall portions of the receptacle at the open end together, as shown at 30, and in the dot and dash lines B' in Figure 11. The strip feeding and forming mechanism is then actuated, the feeding of the strip delivering a previously severed portion of the formed strip, as shown in Figure 24, from the die blocks 157, 157' over the collapsed receptacle end and onto the plates 117 of the slides 107 below a gauge block 190 (Figures 11, 13, 14, 15 and 30 to 32) fixed to the bottom of the portion 108 of the pillar P overhanging the conveyor and receptacle lifter 92. The receptacle lifter is then further actuated to position the receptacle into engagement with the sealing strip and into abutting relation with the gauge block 190, as shown in Figure 31, when the receptacle collapsing and sealing member applying slides are further actuated causing the jaws 110, 110' to engage the opposite sides of the sealing member and clamping it to the collapsed receptacle end. Simultaneously with the clamping of the sealing member to the collapsed receptacle end it is longitudinally fluted, as shown at 191 in Figures 32 and 33, to not only interlock the material of the receptacle with the sealing member to prevent pulling the sealing member from the receptacle, but also serving to reinforce and stiffen the sealing member. This fluting of the sealing member is effected by a bead 192 extending longitudinally of one of the clamping jaws, in the present instance the jaw 110, and arranged to arcuate form in cross section, and the other clamping jaw 110' being arranged with a longitudinal recess 193 and of cross sectional form to correspond with the bead 192. Also simultaneously with the clamping of the sealing member to the receptacle end portions of the material of the sealing member are offset into the material of the receptacle to prevent longitudinal displacement of the sealing member from the receptacle, this being effected by prick punches 194 carried by either one or both of the clamping jaws, in the present instance carried by the jaw 110', as shown in Figures 30 and 31, and arranged therein to offset the material of the sealing member between the flute 191 and the fold of the sealing member, as shown at 195 in Figure 33. During the interim of repositioning the sealed receptacle on the conveyor and the receding movement of the collapsing and sealing member applying slides the cutter mechanism is actuated to sever a sealing member from the formed strip, such severed portion being retained in the channel of the cutter blocks 157, 157' preparatory to being delivered over the collapsed end of a successive receptacle.

To effect variations in the sealing member clamping movement of the slides 106 to compensate for variations in the thickness of the material of the sealing member and of the collapsed receptacle end, as well as for wear in the parts, one wall of the cam grooves in the cams 118 is arranged with a laterally adjustable wall portion, comprising blocks 196 (Figures 9 and 10) slidably mounted in recesses in the periphery of the cams to have adjustment axially thereof and secured in adjusted position by screws passed through countersunk elongated openings 197 through the blocks and threaded into the cams, adjustable abutment screws for the ends of the block being threaded into the end wall of the block engaging recesses in the cams and secured in adjusted position by nuts, as at 198.

Means are provided to couple the drive shaft 67 with the driven shaft 47 from which the receptacle filling means and the means to transfer the receptacles from the filling means to the conveyor are operated, which connection is adapted to be broken when a resistance greater than a predetermined force is applied to the rotation of the driven shaft 47; as, for instance, by the jamming of the transferring mechanism in the improper transferring of the receptacles to the conveyor. This driving connection between the shafts comprises a train of gearing embodying a gear 199 fixed to drive shaft 67 meshing with an intermediate gear 200, meshing with a gear 201 fixed on shaft 102' to drive said latter shaft, and a pinion 202 on said latter shaft meshing with a gear 203 loose on the shaft 47. The latter gear 203 is coupled with the shaft 47 by a head 204 fixed to said shaft and coupled with the gear by a pin 205 of readily severable material, such as brass, engaged in a bushing 206 of hardened material, such as steel, mounted in a perforation in the head and in a similar bushing 207 in a perforation in a disk 208 loose on the shaft, said bushings being arranged eccentric to the axis of the head and disk, and the disk positively connected with the gear 203 by lugs 209 extended laterally from the disk engaged in a transverse slot 210 in the hub of the gear. The pin 205 being made of a soft material, and the bushings of a hardened material said bushings will serve as cutters to shear the pin should a resistance greater than a predetermined force be offered to the rotation of the shaft 47 and thus break the connection between the drive shaft 67 and the driven shaft 47.

To transfer the sealed receptacles from the conveyor, as to a table (not shown), arranged at the side of the conveyor opposite to the table T a pusher in the form of a bar 211 (Figures 1, 2, 4 and 5) is slidably mounted in gibs on the table to have movement transversely of the upper conveyor stretch, the bar being arranged with a head 212 at the end shaped to conform to the curvature of the receptacle wall. The pusher normally assumes a position of rest at one side of the conveyor and out of the line of travel of the receptacles on the conveyor and relative to which a receptacle is positioned as the conveyor comes to rest, as shown in Figure 2, and is actuated during the periods of rest of the conveyor to transfer the receptacle from the conveyor positioned relative thereto. To actuate the pusher it is connected at the end opposite to the head by a link 213 with one arm of a lever 214 rotatably mounted on a stud fixed in a bracket 215, the other arm of the lever having a stud fixed therein carrying a roller, as at 216, to engage a cam groove in a disk 217 fixed on the shaft 67.

The apparatus may be driven from any suitable source of power, and shown as comprising an electric motor, shown in a conventional manner at M, mounted on a supporting platform on the framework and operatively connected with the drive shaft 67 by a sprocket chain 218 passing around a sprocket wheel on the motor shaft and a sprocket wheel 219 fixed to a shaft mounted in bearings fixed upon the table to rotate on an axis tansverse to the axis of shaft 67, and operatively connected with the latter shaft by a worm on the motor shaft meshing with a worm wheel on the drive shaft, as shown at 220.

To gauge the collapsed receptacle end and register the same with the sealing member applying jaws of the slides 106, as shown at B' in Figure 11, an adjustable gauge member in the form of a headed set screw 221 is threaded into the front of the pillar P, and a similar gauge member 222 is adjustably carried in opposed relation to the gauge member 221 by a plate 223 secured to and extending downward from a pair of lugs 224 projecting forward from the overhanging portion 108 of the pillar P, said plate having an opening through which to view the operation of the clamping jaws 110, 110' in clamping the sealing member to the collapsed receptacle end.

It will be obvious that modifications may be made in construction and arrangement of parts, and that portions of the apparatus may be used without others, and come within the scope of the invention.

Having thus described my invention I claim:

1. In apparatus for the purpose specified, means to collapse the open end of a receptacle and clamp a sealing member to said collapsed receptacle end, comprising a pair of slides supported to have reciprocatory movement toward and away from each other, a second pair of slides carried by the first slides to participate in the movement thereof and relative to which the first slides are adapted to have independent movement, a pair of levers pivotally supported on horizontal axes extending transversely of the movement of the slides and have movement in the plane of movement of the slides, a drive shaft rotatable on an axis extending in the plane of movement of the slides, and operative connection between said shaft and slide actuating levers to oscillate the levers and reciprocate the slides.

2. Apparatus as claimed in claim 1, wherein the slide actuating levers embodying a pair of parallel arms connected together and weighted at one end, one arm of said levers being operatively connected with the first slides and the other arm with the drive shaft.

3. Apparatus as claimed in claim 1, wherein the slide actuating levers embody a pair of parallel arms connected together and weighted at one end, one arm of each lever having a pin and slot connection with one of the first slides, and cams on the drive shaft with which cam following rollers carried by the other arms of the levers co-operate to operatively connect and actuate the levers from the drive shaft.

4. In apparatus for the purpose specified, the combination with the framework, of a receptacle support carried by the framework to have vertical reciprocatory movement, a standard fixed upon the framework arranged with a head to overhang the support, a pair of slides mounted in the head to have reciprocatory movement toward and away from each other, a second pair of slides carried by the first slides and relative to which the first slides are adapted to have independent movement, means to actuate the receptacle support to position the open end of a receptacle thereon between the slides, a pair of levers pivotally supported by the standard to have movement in the plane of movement of the slides, each lever embodying a pair of parallelly extending arms and one arm of each lever connected with one of the first slides, a drive shaft, cams on said shaft, and a cam following roller carried by the other arm of each lever to co-operate with the cams to actuate the levers and slides in timed sequence with the movement of the receptacle support to position the open end of the receptacle between the slides, said second slides being operative to collapse the receptacle end and serve as a support for a closure member of inverted V shape in cross section engaged over the collapsed receptacle end, and the first slides to clamp and seal said closure member to the collapsed receptacle end.

5. Apparatus as claimed in claim 1, wherein the slide actuating levers are pivotally supported intermediate the ends and arranged with a counterweight at the side of the pivot supports of the levers opposite to which the levers are connected with the slides and shaft.

6. In apparatus for the purpose specified, a vertically movable receptacle support, a pair of slides mounted to have reciprocatory movement toward and away from each other, a second pair of slides carried by the first slides to participate in the movement thereof and relative to which the first slides are adapted to have movement, said second slides being of T-form and slidably mounted between gibs and in relation to an elongated recess in the bottom of the first slides with the T head arranged at one end of said first slides, a block fixed to the second slides slidably engaged in the recess in the bottom of the first slide, and a spring confined within the recess between said block and end wall of the recess to urge the slides to position with the T head to extend beyond the end of the first slides, said slides being arranged above the receptacle support, means to actuate the receptacle support to position the open end of the receptacle between the slides, and means to actuate the slides in timed sequence with the movement of the receptacle support to position a receptacle between the slides, said second slides being operative to collapse the receptacle end and serve as a support for a V shaped sealing member engaged over the collapsed receptacle end, and the first slides being operative to clamp said sealing member to the collapsed receptacle end and arranged to simultaneously with the clamping of the closure member to the receptacle longitudinally flute the opposite portions of the closure member to interlock the same with the interposed material of the receptacle and seal the closure member to the collapsed receptacle end.

Signed at the city of New York, in the county of New York, and State of New York, this 31st day of May, 1928.

ELLIS L. JONES.